United States Patent
Imai

(10) Patent No.: US 7,258,009 B2
(45) Date of Patent: Aug. 21, 2007

(54) CLOCK GENERATING DEVICE, VIBRATION TYPE GYRO SENSOR, NAVIGATION DEVICE, IMAGING DEVICE, AND ELECTRONIC APPARATUS

(75) Inventor: Nobuyuki Imai, Suwa (JP)

(73) Assignee: Seiko Epson Corporation (JP)

(*) Notice: Subject to any disclaimer, the term of this patent is extended or adjusted under 35 U.S.C. 154(b) by 187 days.

(21) Appl. No.: 11/043,711

(22) Filed: Jan. 26, 2005

(65) Prior Publication Data

US 2005/0160813 A1 Jul. 28, 2005

(30) Foreign Application Priority Data

Jan. 27, 2004 (JP) ............................. 2004-018377
Oct. 14, 2004 (JP) ............................. 2004-299939

(51) Int. Cl.
  *G01P 9/04* (2006.01)
(52) U.S. Cl. .................................. 73/504.12
(58) Field of Classification Search ............. 73/504.12, 73/504.14, 504.16
See application file for complete search history.

(56) References Cited

U.S. PATENT DOCUMENTS 6,467,347 B1* 10/2002 Fujimoto ................. 73/504.12
6,553,835 B1* 4/2003 Hobbs et al. ............ 73/504.16

FOREIGN PATENT DOCUMENTS

| JP | 08-285933 | 11/1996 |
| JP | 2001-292367 | 10/2001 |
| JP | 2003-004457 | 1/2003 |

\* cited by examiner

Primary Examiner—John E. Chapman
(74) Attorney, Agent, or Firm—Harness, Dickey & Pierce, P.L.C.

(57) ABSTRACT

A vibration gyro sensor is provided which is capable of generating time information and detecting an angular velocity. A driving signal for driving a tuning fork piezoelectric vibrating reed is generated based on an excitation signal generated by an oscillation circuit. An angular velocity signal is obtained based on a detection signal generated by a detection electrode of the tuning fork piezoelectric vibration reed. The excitation signal generated by the oscillation circuit is input to a divider such that a timer clock signal is generated.

7 Claims, 7 Drawing Sheets

CLOCK GENERATING DEVICE, VIBRATION TYPE GYRO SENSOR, NAVIGATION DEVICE, IMAGING DEVICE, AND ELECTRONIC APPARATUS

RELATED APPLICATIONS

This application claims priority to Japanese Patent Application Nos. 2004-018377 filed Jan. 27, 2004 and 2004-299939 filed Oct. 14, 2004 which are hereby expressly incorporated by reference herein in their entirety.

BACKGROUND

1. Technical Field

The present invention relates to a clock generating device, a vibration type gyro sensor, a navigation device, an imaging device, and an electronic apparatus which can be suitably applied to an angular velocity sensor having a real time clock (RTC) function.

2. Related Art

In a conventional imaging device as disclosed in Japanese Unexamined Patent Application Publication No. 2001-292367, blurring is corrected from image signals captured by a charge coupled device (CCD) by a blurring detection algorithm in software. Further, in 2001-292367, in order to accurately perform the blurring correction by simplifying the discrimination between blurring and subject movement, an imaging device to which a gyro sensor for detecting an angular velocity is mounted is disclosed.

Further, in an imaging device such as a digital still camera (DSC), a digital video camera (DVC) or the like, since time data is incorporated into video recorded data, a real time clock (RTC) module having a time and calendar function, as well as the gyro sensor, is also mounted thereto.

Further, in order for a driver to know his own current position when driving, a global positioning system (GPS) navigation system has been mounted to a vehicle. In this case, as disclosed in Japanese Unexamined Patent Application Publication No. 2003-4457, in addition to a GPS receiver, a gyro sensor is mounted as a stand-alone navigation detecting unit, in consideration of the case that a GPS signal can not be received when the vehicle passes through a tunnel or the like.

Further, the GPS navigation system has a RTC module for generating time information which is mounted thereto separately from the gyro sensor, in order to perform operations such as an arrival time expectation or the like when guiding the driver to a destination.

Further, in Japanese Unexamined Patent Application Publication No. H8-285933, in order to reduce the satellite tracking time which is used to receive the GPS signal at the time of positioning, a method in which a visible satellite at the current time by using the current time from the RTC and a positioning calculation result or a navigation message stored in a storage unit is easily determined is disclosed.

However, in a conventional method for detecting the angular velocity using the gyro sensor, the RTC module needs to be mounted separately from the gyro sensor in order to generate the time information. Thus, there are problems in that miniaturization of the device is limited, and a manufacturing cost increases.

Accordingly, it is an object of the present invention to provide a clock generating device, a vibration type gyro sensor, a navigation device, an imaging device, and an electronic apparatus which are capable of generating time information and detecting an angular velocity.

SUMMARY

In order to solve the above-mentioned problems, according to a first aspect of the present invention, there is provided a clock generating device for generating a timer clock signal based on an excitation signal which excites a vibration type gyro sensor.

According to this configuration, in order to generate the timer clock signal, a piezoelectric vibrator of the vibration type gyro sensor can be used. Thus, there is no need for mounting a RTC module separately from the vibration type gyro sensor in order to generate the time information. Further, while suppressing the device from being large and the manufacturing cost from increasing, a time and calendar function and an angular velocity detection function can be realized.

Further, according to a second aspect of the present invention, there is provided a vibration type gyro sensor comprising an exciting unit for exciting a vibrator, a detecting unit for detecting a Coriolis force which acts in a direction orthogonal to an excitation direction of the vibrator, and a clock generating unit for generating a timer clock signal based on an excitation signal which excites the vibrator.

According to this configuration, since the vibrator of the vibration type gyro sensor is used, the timer clock signal can be generated and the angular velocity can be detected. For this reason, there is no need for mounting the RTC module separately from the vibration type gyro sensor in order to generate the time information. Further, even if both the time and calendar function and the angular velocity detection function are realized, the device can be prevented from being large and the manufacturing cost can be prevented from increasing.

Further, in a vibration type gyro sensor according to a third aspect of the present invention, a resonance frequency of the vibrator may be $32.768 \times N$ kHz (where N is a positive integer).

According to this configuration, while preventing an excitation frequency of the vibrator from being included within an audible frequency band, the vibration type gyro sensor may be small. Further, since counters are arrange in parallel, a signal of 1 Hz can be generated and a clock signal required for updating the time information can be easily generated.

Further, in a vibration type gyro sensor according to a fourth aspect of the present invention, the vibrator may be a piezoelectric vibrator or an electrostatic vibrator.

According to this configuration, the vibrator can be excited by a piezoelectric effect or an electrostatic force, and the Coriolis force which acts in a direction orthogonal to an excitation direction can be detected. For this reason, the vibration type gyro sensor can be small and the angular velocity can be obtained.

Further, in a vibration type gyro sensor according to a fifth aspect of the present invention, the piezoelectric vibrator is a quartz vibrator.

According to this configuration, a precision of the resonance frequency of the piezoelectric vibrator can be improved. Further, even when the timer clock signal is generated from the vibration type gyro sensor, the precision of the time can be improved.

Further, in a vibration type gyro sensor according to a sixth aspect of the present invention, the electrostatic vibrator is a surface micromachined vibrator.

According to this configuration, since the vibration type gyro sensor can be configured by using a micromachining technology, the vibration type gyro sensor can be small.

Further, in a vibration type gyro sensor according to a seventh aspect of the present invention, the surface micromachined vibrator comprises a body which is suspended on a substrate to shake (vibrate) in a direction horizontal to the substrate, a first movable finger which is provided in the body to project in a first direction horizontal to the substrate, a second movable finger which is provided in the body to project in a direction orthogonal to the first direction, a first fixed finger which is fixed to the substrate to be engaged with the first movable finger, and a second fixed finger which is fixed in the substrate to be engaged with the second movable finger.

According to this configuration, the electrostatic vibrator can be integrated on the substrate by using the micromachining technology. Thus, the vibration type gyro sensor can be small.

Further, in a vibration type gyro sensor according to an eighth aspect of the present invention, the clock generating unit comprises a time information output unit for outputting time information, and a date information output unit for outputting date information.

According to this configuration, both the time and calendar function and angular velocity detection function can be realized, without mounting the RTC module separately from the vibration type gyro sensor.

Further, a vibration type gyro sensor according to a ninth of the present invention further comprises a stopping unit for causing the detecting unit to stop operations.

According to this configuration, the timer clock signal can be, generated by using the piezoelectric vibrator of the vibration type gyro sensor. Further, it is possible to stop the operation of detecting the angular velocity. For this reason, even when the angular velocity detection function is not needed, the time and calendar function can be exhibited while saving power.

Further, there is provided an electronic apparatus according to a tenth aspect of the present invention which comprises a vibration type gyro sensor as described in any one of the second to ninth aspects.

According to this configuration, even when both the time and calendar function and the angular velocity detection function are realized in the electronic apparatus, the vibration type gyro sensor and the RTC module do not need to be separately mounted. For this reason, the mounting area where the vibration type gyro sensor and the RTC module are to be mounted on the substrate can be suppressed from increasing. Thus, the electronic apparatus can be small and the manufacturing cost can be reduced.

Further, there is provided a navigation device according to an eleventh aspect of the present invention. The navigation device comprises a global positioning system (GPS) receiver for receiving a GPS signal to be transmitted from a GPS satellite, a map data acquiring unit for acquiring map data of a predetermined area, a vibration type gyro sensor for generating a timer clock signal based on an excitation signal which excites a vibrator, a positioning unit for performing positioning based on the GPS signal received by the GPS receiver or a detection signal detected by the vibration type gyro sensor, a time information generating unit for generating time or date information based on a clock signal output from the vibration type gyro sensor, and a satellite tracking unit for tracking the GPS satellite based on the time information generated by the time information generating unit.

According to this configuration, the positioning can be performed based on the GPS signal and the detection signal detected by the vibration type gyro sensor, such that the positioning can be stably performed and the precision of the positioning can be improved. Further, there is no need for mounting a RTC module separately from the vibration type gyro sensor, such that a visible satellite at the current time can be readily determined and the time information can be generated. For this reason, while suppressing the navigation device from being large and a manufacturing cost from increasing, both the time and calendar function and the angular velocity detection function can be realized. Further, the tracking time of the satellite which is used to receive the GPS signal at the time of the positioning can be reduced.

Further, there is provided an imaging device according to a twelfth aspect of the present invention. The imaging device comprises an imaging element for imaging, a vibration type gyro sensor for generating a timer clock signal based on an excitation signal which excites a vibrator, a blurring correcting unit for correcting blurring of an image captured by the imaging element based on a detection signal detected by the vibration type gyro sensor, and a time information generating unit for generating time or date information based on a clock signal output from the vibration type gyro sensor.

According to this configuration, a blurring correction can be performed based on the detection signal detected by the vibration type gyro sensor. Thus, blurring and a subject movement can be easily discriminated, and time information can be generated without mounting a RTC module separately from the vibration type gyro sensor. For this reason, while suppressing the imaging device from being large and a manufacturing cost from increasing, the time and calendar function can be realized, and the blurring correction can be performed with favorable precision.

DETAILED DESCRIPTION

Hereinafter, a vibration type gyro sensor according to an embodiment of the present invention will be described with reference to the drawings.

Figure 1:
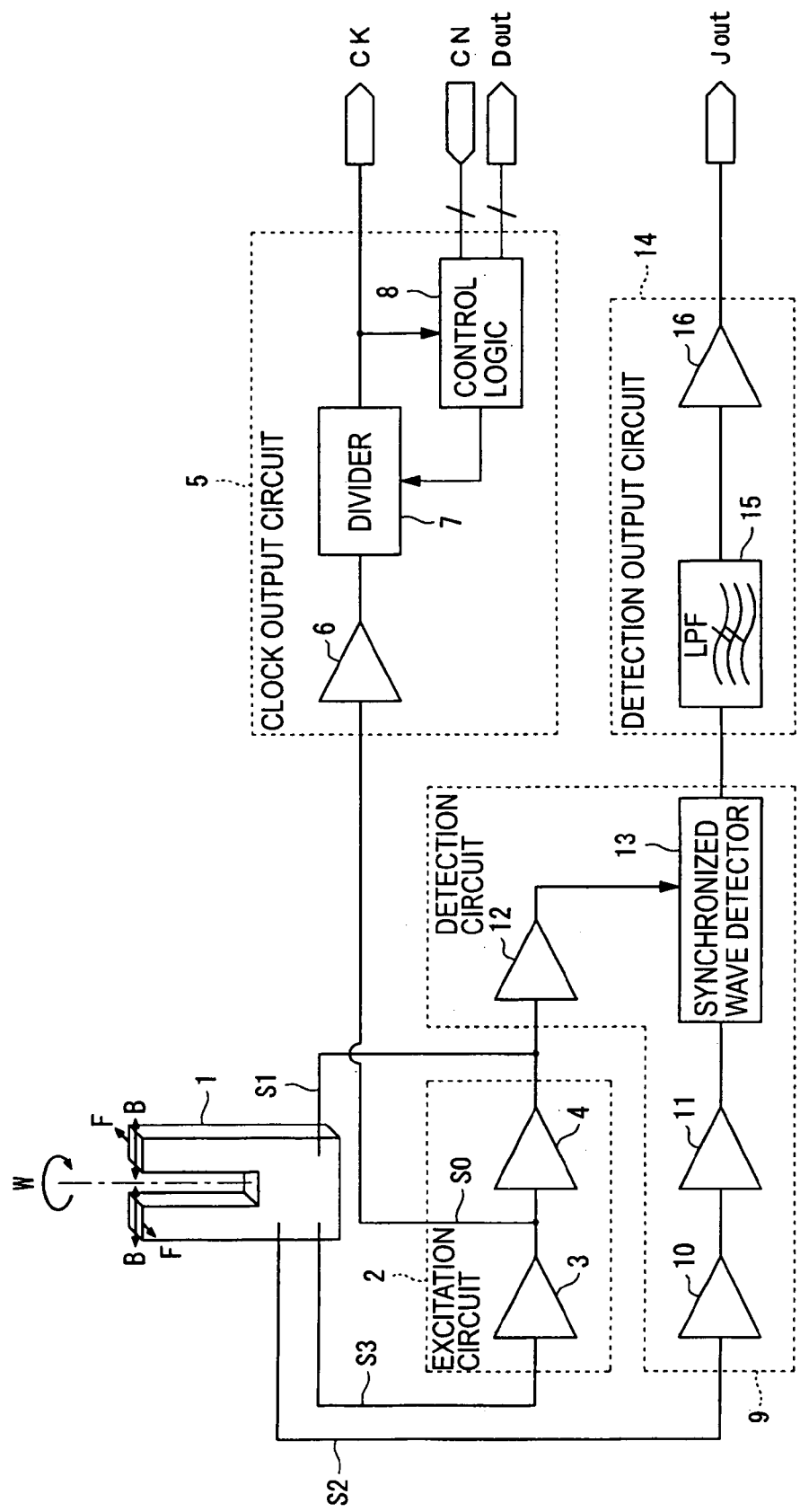
FIG. 1 is a block diagram showing a configuration of a vibration type gyro sensor according to a first embodiment of the present invention.

FIG. 1 is a block diagram showing a configuration of a vibration type gyro sensor according to a first embodiment of the present invention.

Referring to FIG. 1, the vibration type gyro sensor has a tuning fork piezoelectric vibrating reed 1, an excitation circuit 2 for exciting the tuning fork piezoelectric vibrating reed 1, a detection circuit 9 for detecting a Coriolis force F acting on a vibration B when the tuning fork piezoelectric vibrating reed 1 rotates at an angular velocity, a detection output circuit 14 for generating an angular velocity signal Jout based on an output from the detection circuit 9, and a clock output circuit 5 for generating a timer clock signal based on an excitation signal S0 which excites the tuning fork piezoelectric vibrating reed 1.

Figure 2:
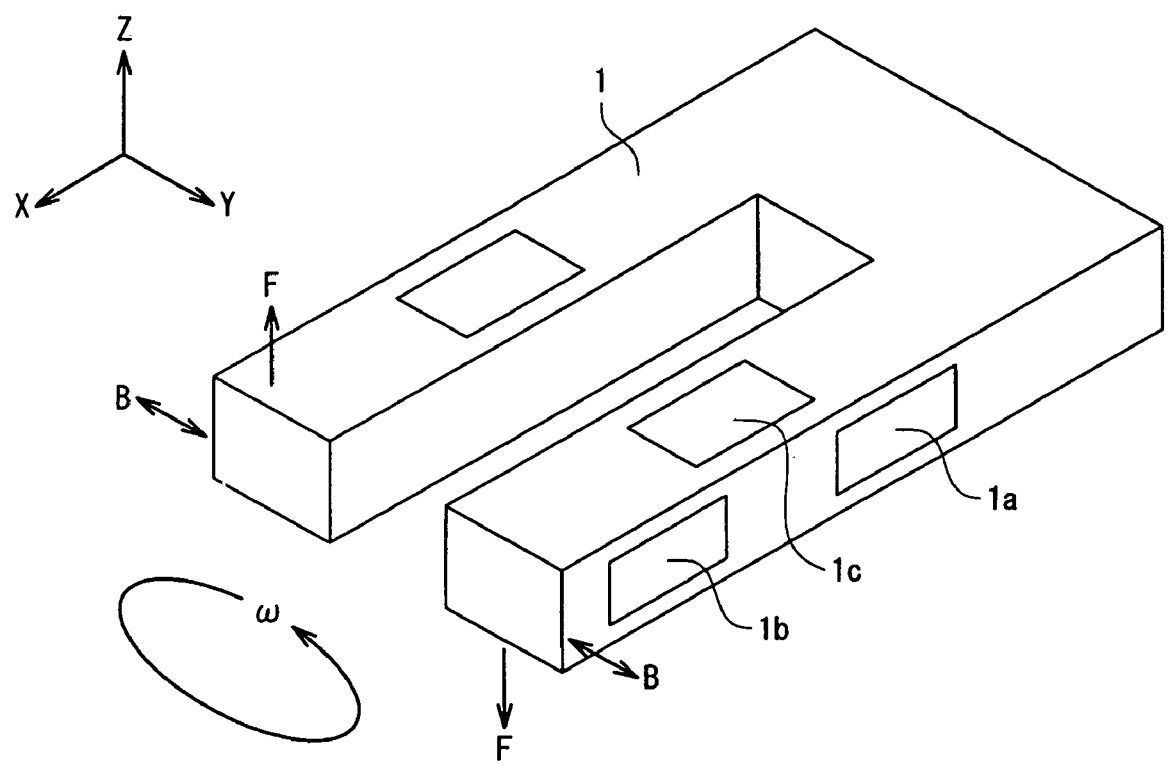
FIG. 2 is a perspective view schematically showing a configuration of a tuning fork piezoelectric vibrating reed 1 shown in FIG. 1.

FIG. 2 is a perspective view schematically showing a configuration of the tuning fork piezoelectric vibrating reed 1 shown in FIG. 1.

Referring to FIG. 2, for example, the tuning fork piezoelectric vibrating reed 1 is provided with a pair of vibrating arms which extend in an X axis direction. Further, the tuning fork piezoelectric vibrating reed 1 may be formed by cutting a portion of a flat panel made a piezoelectric material such as quartz and bending the cut portion in a tuning fork shape.

Then, on a surface orthogonal to a Z axis direction of each vibrating arm, a detection electrode 1c for outputting a detection signal S2 generated when a coriolis force F acts on a vibration B is provided. Further, on a surface orthogonal to a Y axis direction of each vibrating arm, a driving electrode 1a which inputs a driving signal S1 for driving the tuning fork piezoelectric vibrating reed 1 and a feedback electrode 1b which outputs a feedback signal S3 for monitoring the detection signal S2 are provided.

Furthermore, as a material for the tuning fork piezoelectric vibrating reed 1, in addition to quartz, for example, PZT (lead zirconate titanate)-based piezoelectric ceramic, langasite (La3Ca5SiO14), potassium phosphate (GaPO4), lithium tantalate (LiTaO3), or BNT-BT-ST-based unleaded piezoelectric ceramic or the like may be used. Further, the resonance frequency of the tuning fork piezoelectric vibrating reed 1 is preferably set to 32.768 ((N kHz (where N is a positive integer).

If an alternating current (AC) voltage is applied to the driving electrode 1a of the tuning fork piezoelectric vibrating reed 1, the vibrating arms vibrate to be curved within an XY plane. Then, in a state in which the vibrating arms vibrate to be curved within the XY plane, if the tuning fork piezoelectric vibrating reed 1 rotates around an X axis at an angular velocity ω, the coriolis force F acts in the Z axis direction, such that the vibrating arms also vibrate to be curved within an XZ plane. For this reason, the detection signal S2 which corresponds to the coriolis force F is generated by the detection electrode 1c by the piezoelectric effect. Here, since the coriolis force F is proportional to the angular velocity ω, the angular velocity ω, can be obtained by deriving the detection signal S2 generated by the detection electrode 1c.

That is, referring to FIG. 1, a gain of the excitation signal S0 generated by an oscillation circuit 3 is adjusted by an automatic gain adjusting circuit 4, such that the driving signal S1 for driving the tuning fork piezoelectric vibrating reed 1 is output. The driving signal S1 output from the automatic gain adjusting circuit 4 is input to the driving electrode 1a of FIG. 2, such that the vibration arms of the tuning fork piezoelectric vibrating reed 1 vibrate to be curved within the XY plane. Then, in this situation, a mechanical vibration is converted to an electrical signal and the electrical signal is derived from the feedback electrode 1b, such that the feedback signal S3 is fed back to the oscillation circuit 3. Accordingly, an oscillation loop can be configured by using the oscillation circuit 3, and the tuning fork piezoelectric vibrating reed 1 can be oscillated with a tuning fork natural frequency. Further, by controlling the amplitude of the driving signal S1 by the automatic gain adjusting circuit 4, the tuning fork natural vibration amplitude can be always maintained with a constant value. Thus, sensitivity can be stabilized.

Meanwhile, the detection signal S2 generated by the detection electrode 1c of the tuning fork piezoelectric vibrating reed 1 is converted from a current to a voltage by an I/V conversion amplifier 10, and then the converted signal is amplified by an AC amplifier 11. Further, the amplified signal is input to a synchronized wave detector 13. The synchronized wave detector 13 is also supplied with the driving signal S1 through a 90 degree phase shifter 12, such that the amplified signal from the AC amplifier 11 is wave-detected in synchronization with a reference phase of the oscillation circuit 3. That is, since the detection signal S2 is equivalent to a signal amplitude-modulated (AM) at the angular velocity ω with the frequency of the driving signal S1 as a carrier, by wave-detecting the driving signal S1 as a reference signal in a synchronization manner, the angular velocity ω can be derived.

A wave detection signal output from the synchronized wave detector 13 passes through a low pass filter 15, such that an overlapped high frequency component is removed from the wave detection signal. Then, the wave detection signal with the high frequency component removed is output through an output amplifier 16, such that the angular velocity signal Jout can be obtained.

Further, the excitation signal S0 generated by the oscillation circuit 3 is input to a divider 7 through a buffer 6. In this case, a counter is provided in the divider 7 such that the excitation signal S0 can be divided in the divider 7 and then a timer clock signal CK can be generated. For example, if a resonance frequency of the tuning fork piezoelectric vibrating reed 1 is set to 32.768×N kHz (where N is a positive integer), by arranging fifteen counters parallel to each other, a signal of 1 Hz can be generated as the clock signal CK, and thus a count operation can be performed for every second.

Further, a control logic 8 is supplied with the clock signal CK and a control signal CN to configure a RTC having a time and calendar function based on the clock signal CK. Then, time and date information generated by the control logic 8 can be output as a data signal Dout.

In this case, by generating the timer clock signal CK based on the excitation signal S0 which excites the vibration type gyro sensor, the tuning fork piezoelectric vibrating reed 1 of the vibration type gyro sensor can be used to generate the timer clock signal CK. For this reason, there is no need for mounting a RTC module separately from the vibration type gyro sensor in order to generate the time and date information. Thus, while suppressing the device from being large and a manufacturing cost from increasing, both the time and calendar function and an angular velocity detection function can be realized.

Further, since quartz is used as a material for the tuning fork piezoelectric vibrating reed 1, precision of the resonance frequency of the tuning fork piezoelectric vibrating reed 1 can be improved. Thus, even when the timer clock signal CK is generated from the vibration type gyro sensor, the time precision can be improved.

Further, since the resonance frequency of the tuning fork piezoelectric vibrating reed 1 is set to 32.768×N kHz, the resonance frequency of the tuning fork piezoelectric vibrating reed 1 can be prevented from being included within an audible frequency band, while the vibration type gyro sensor can be small. Further, since the counters are arranged parallel to each other, the signal of 1 Hz can be generated, such that the time information can be easily generated. For example, when N=2, 3, 4 . . . , the number of the counters increases accordingly, such that the signal of 1 Hz can be generated.

Further, in the above-mentioned embodiment, a method in which a two-leg type tuning fork piezoelectric vibrating reed 1 is used as the piezoelectric vibrator to be used for the vibration type gyro sensor is described. However, other than the tuning fork piezoelectric vibrating reed 1, for example, a three or four-leg type tuning fork piezoelectric vibrator, an H-shaped tuning fork piezoelectric vibrator, or a tuning piezoelectric vibrator can be used.

Figure 3:
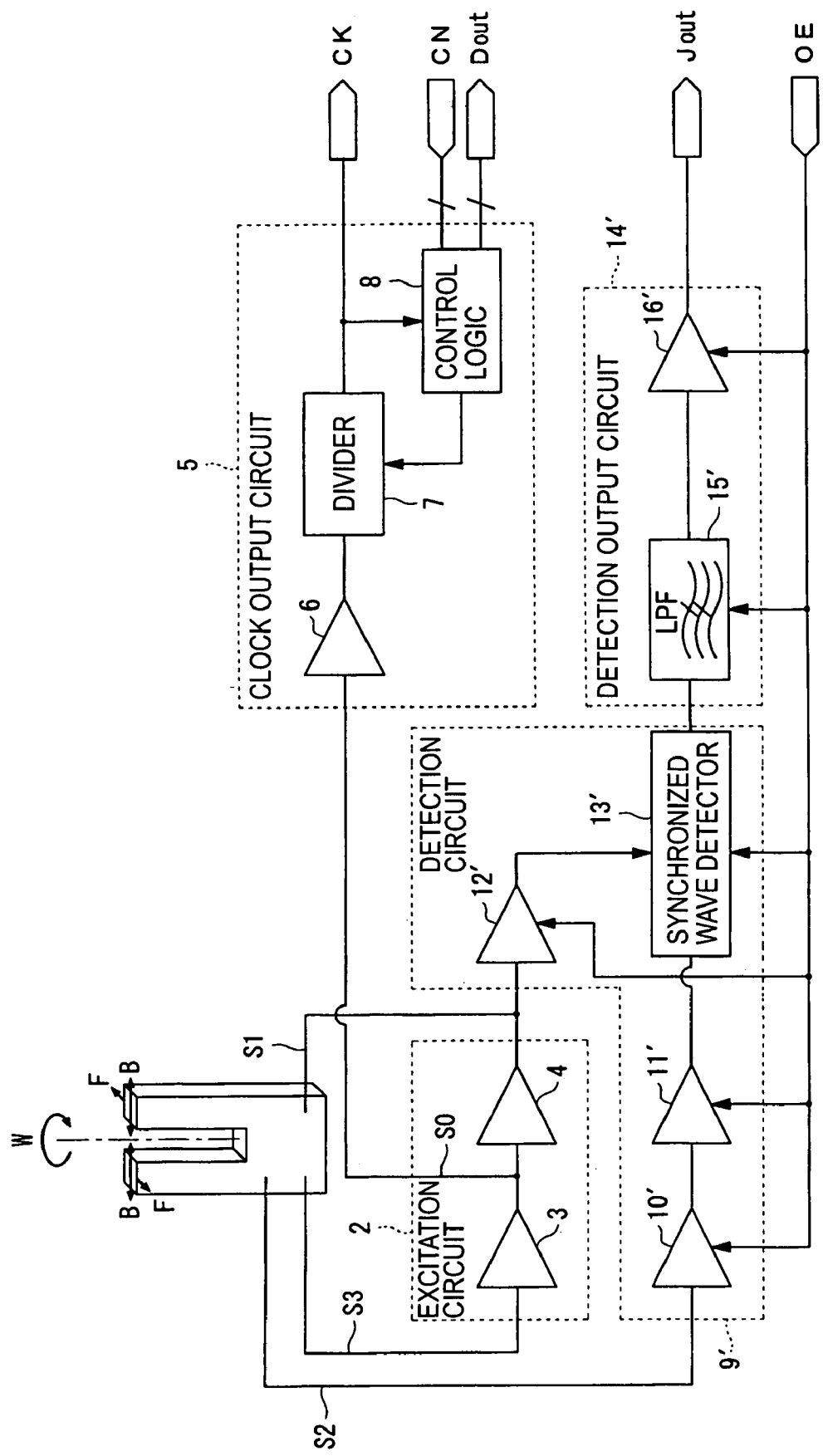
FIG. 3 is a block diagram showing a configuration of a vibration type gyro sensor according to a second embodiment of the present invention.

FIG. 3 is a block diagram showing a configuration of a vibration type gyro sensor according to a second embodiment of the present invention.

Referring to FIG. 3, instead of the detection circuit 9 and the detection output circuit 14 shown in FIG. 1, a detection circuit 9' and a detection output circuit 14' are provided. Then, in the detection circuit 9', instead of the IV conversion amplifier 10, the AC amplifier 11, the a 90 degree phase shifter 12, and the synchronized wave detector 13 shown in FIG. 2, an I/V conversion amplifier 10', an AC amplifier 11', a right angle phase shifter 12', and a synchronized wave detector 13' are provided. Further, in the detection output circuit 14', instead of the low pass filter 15 and the output amplifier 16 shown in FIG. 2, a low pass filter 15' and an output amplifier 16' are provided.

In this case, the IV conversion amplifier 10', the AC amplifier 11', the right angle phase shifter 12', the synchronized wave detector 13', the low pass filter 15', and the output amplifier 16' are provided an out enable signal OE. Operations of the IV conversion amplifier 10', the AC amplifier 11', the right angle phase shifter 12', the synchronized wave detector 13', the low pass filter 15', and the output amplifier 16' can be stopped according to the out enable signal OE.

According to this configuration, the timer clock signal CK can be generated based on the excitation signal S0 which excites the tuning fork piezoelectric vibrating reed 1, while the operation of detecting the angular velocity can be stopped. For this reason, even when the angular velocity detection function is not needed, while saving power, the time and calendar function can be exhibited.

Figure 4:
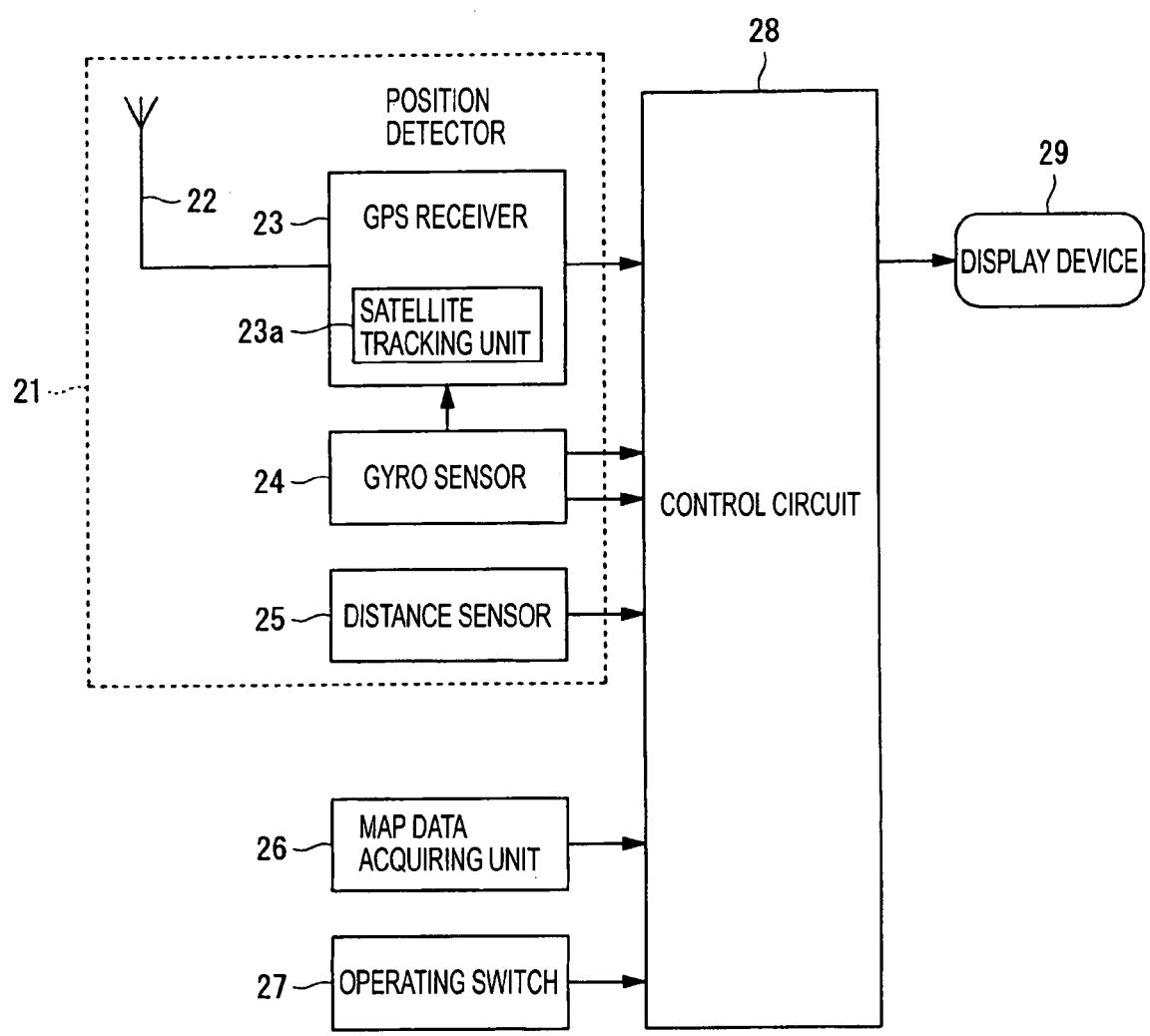
FIG. 4 is a block diagram schematically showing a configuration of a navigation device according to a third embodiment of the present invention.

FIG. 4 is a block diagram schematically showing a configuration of a navigation device according to a third embodiment of the present invention.

Referring to FIG. 4, the navigation device comprises a position detector 21 for detecting its own position, a map data acquiring unit 26 for acquiring map data of a predetermined area, an operating switch 27 for performing various operations of the navigation device, a display device 29 capable of displaying its own current position on the map to overlap, and a control circuit 28 for performing an overall control of the above-mentioned devices having been associated with each other.

Further, the position detector 21 has a GPS receiver 23, a vibration type gyro sensor 24, and a distance sensor 25, and the GPS receiver 23 has an antenna 22 for receiving electrical waves from a GPS satellite, and a satellite tracking unit 23a for tracking the GPS satellite which is used to receive a GPS signal at the time of positioning.

In this case, the GPS receiver 23 acquires a navigation message (time information and orbit information of an earth satellite) by receiving electrical waves from a plurality of artificial satellites, such that it can obtain its own absolute position on the earth. Further, it measures a Doppler shift frequency from the artificial satellite to calculate its own velocity.

Further, by using the vibration type gyro sensor 24 and the distance sensor 25, its own moving azimuth and a distance can be calculated, such that its own current position can calculate with a stand-alone navigation. For this reason, even when the GPS signal can not be received in some environments such as a tunnel, the GPS receiver 23 can grasp its own current position and can improve calculation precision of its own current position.

That is, when receiving electrical waves transmitted from the artificial satellite, the GPS receiver 23 demodulates the electrical waves, thereby acquiring the time information and the orbit information of the artificial satellite. When the position of the artificial satellite and the propagation time of the electrical waves from the artificial satellite to the GPS receiver 23 are obtained based on the time information and the orbit information of the artificial satellite, a simultaneous equation in which the position of the GPS receiver 23 is an unknown number can be established, such that the position of the GPS receiver 23 can be determined.

In this case, by performing operations to signals received from three or more GPS artificial satellites, the longitude and the latitude of the current position can be obtained, and simultaneously a universal time coordinate (UTC) at the standard time can be acquired based on the received signals. At present, in order to cover the total surface of the earth, twenty five artificial satellites in total are going around six orbits which reach an altitude of 20000 km from the earth. For this reason, it is necessary to track at least three artificial satellites capable of being tracked among the twenty five artificial satellites in order to acquire the current position of the GPS receiver 23.

In this case, the configuration shown in FIG. 1 may be used as the vibration type gyro sensor 24. That is, the vibration type gyro sensor 24 can generate the driving signal S1 for driving the tuning fork piezoelectric vibrating reed 1 based on the excitation signal S0 generated by the oscillation circuit 3 shown in FIG. 1. Further, the vibration type gyro sensor 24 can obtain the angular velocity signal Jout based on the detection signal S2 generated by the detection electrode 1c of the tuning fork piezoelectric vibrating reed 1. In addition, the vibration type gyro sensor 24 can generate the timer clock signal CK based on the excitation signal S0 generated by the oscillation circuit 3. Then, the angular velocity signal Jout output from the vibration type gyro sensor 24 is input to the control circuit 28, while the data signal Dout output from the vibration type gyro sensor 24 is input to the GPS receiver 23 and the control circuit 28.

If the data signal Dout output from the vibration type gyro sensor 24 is input to the GPS receiver 23, the satellite tracking unit 23a can estimate the visible satellite at the current time based on the current time derived from the data signal Dout. Then, by selecting the artificial satellite to be used for receiving the GPS signal at the time of the positioning based on the estimation result, the artificial satellite can be rapidly tracked without scanning unnecessary artificial satellites, so that the rising of the positioning calculation may be improved.

Further, if the angular velocity signal Jout output from the vibration type gyro sensor 24 is input to the control circuit 28, the control circuit 28 can calculate an azimuth based on the angular velocity signal Jout. Further, the control circuit 28 refers to the distance to be output from the distance sensor 25, thereby performing the stand-alone navigation.

Further, if the data signal Dout output from the vibration type gyro sensor 24 is input to the control circuit 28, operations such as an arrival time expectation can be performed for the guidance to a destination. Further, if the expected arrival time is calculated, the control circuit 28 derives a map, in which its own current position is included, from the map data acquiring unit 26, and displays the map having its own current position marked, together with the expected arrival time, the display device 29.

According to this configuration, the visible satellite at the current time can be easily determined and the time information can be generated, without mounting the RTC module separately from the vibration type gyro sensor 24 to the navigation device. For this reason, both the time and calendar function and the angular velocity detection function can be realized, while suppressing the navigation device from being large and the manufacturing cost from increasing. Further, the tracking time of the satellite which is used to receive the GPS signal at the time of the positioning can be reduced.

Figure 5:
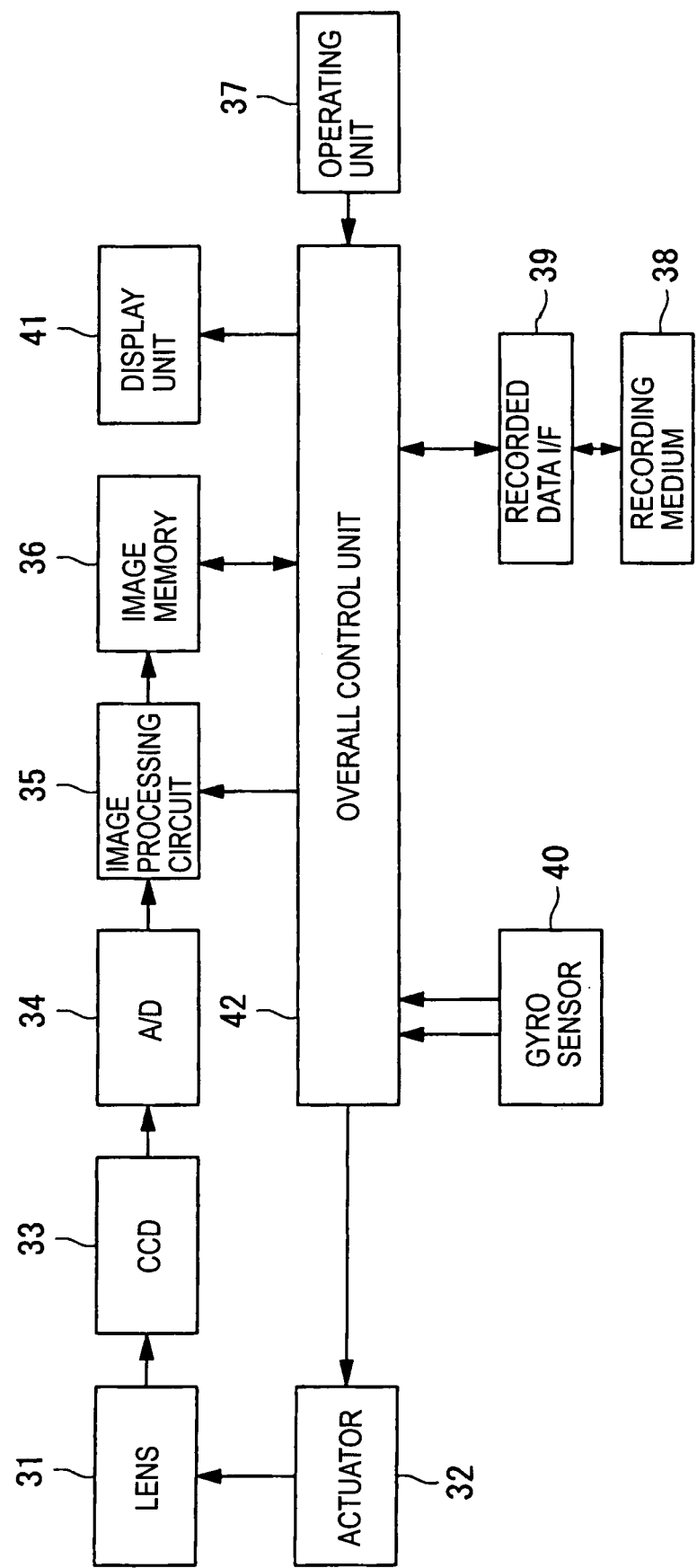
FIG. 5 is a block diagram schematically showing a configuration of an imaging device according to a fourth embodiment of the present invention.

FIG. 5 is a block diagram schematically showing a configuration of an imaging device according to a fourth embodiment of the present invention.

Referring to FIG. 5, an optical image of a subject which is incident through a lens 31 is focused on an imaged surface of a CCD 33. The optical image focused on the imaged surface of the CCD 33 is converted to an image signal through a photoelectric conversion, and the converted image signal is digitized by an A/D converter 34. Then, the digitized image signal is subjected to image processing in the image processing circuit 35. Subsequently, the processed image signal is stored in an image memory 36 and displayed on the display unit 41. In addition, the signal subjected to the image processing in the image processing circuit 35 may be transmitted to a recording medium 38 through a recorded data interface 39 so that it may be stored in the recording medium 38. In case of a DSC, a card interface as the recorded data interface 39 and a memory card as the recording medium 38 may be used. In case of a DVC, a magnetic tape or the like as the recorded data interface 39 and the recording medium 38 may be used.

In this case, the vibration type gyro sensor 40 may be connected to the overall control portion 42, and then the configuration shown in FIG. 1 may be used as the vibration type gyro sensor 40. That is, the vibration type gyro sensor 40 can generate the driving signal S1 for driving the tuning fork piezoelectric vibrating reed 1 based on the excitation signal S0 generated from the oscillation circuit 3 shown in FIG. 1 and obtain the angular velocity signal Jout based on the detection signal S2 generated by the detection electrode 1c of the tuning fork piezoelectric vibrating reed 1. In addition, the vibration type gyro sensor 40 can generate the timer clock signal CK based on the excitation signal S0 generated by the oscillation circuit 3. Then, the angular velocity signal Jout and the data signal Dout output from the vibration type gyro sensor 40 are input to an overall control unit 42.

The overall control unit 42 controls an actuator 32 based on the angular velocity signal Jout output from the vibration type gyro sensor 40 and moves a lens 31 so as to correct blurring, such that the blurring correction can be performed. Alternatively, the overall control unit 42 can control an excision range of the image stored in the image memory 36 based on the angular velocity signal Jout output from the vibration type gyro sensor 40, such that the corrected image can be displayed on the display unit 41 or can be stored in the recording medium 38.

In addition, if the data signal Dout output from the vibration type gyro sensor 40 is input to the overall control unit 42, an image in which the time and data information is incorporated can be displayed on the display unit 41 or can be stored in the recording medium 38 by the overall control unit 42.

According to this configuration, the blurring correction can be performed based on the detection signal S2 detected from the vibration type gyro sensor 40, such that the discrimination between blurring and a subject movement can be easily discriminated. Further, the time and date information can be generated without mounting the RTC module separately from the vibration type gyro sensor 40 on the imaging device. For this reason, while suppressing the imaging device from being large and the manufacturing cost from increasing, the time and calendar function can be realized. Further, the blurring correction can be performed with high precision.

In addition, by an operating unit 37, the power of the imaging device may be turned on/off or zooming of the lens 31 may be performed. Further, by the operation unit 37, the imaging timing can be determined or the blurring correction can be turned on/off.

Then, when the blurring correction is turned off, by using the configuration of FIG. 3 as the vibration type gyro sensor 24, the data signal Dout can be generated based on the excitation signal S0 which excites the tuning fork piezoelectric vibrating reed 1, while the operation of detecting the angular velocity can be stopped. For this reason, the image in which the time and date information is incorporated can be displayed on the display unit 41 or can be stored in the recording medium 38. Further, power can be saved.

Figure 6:
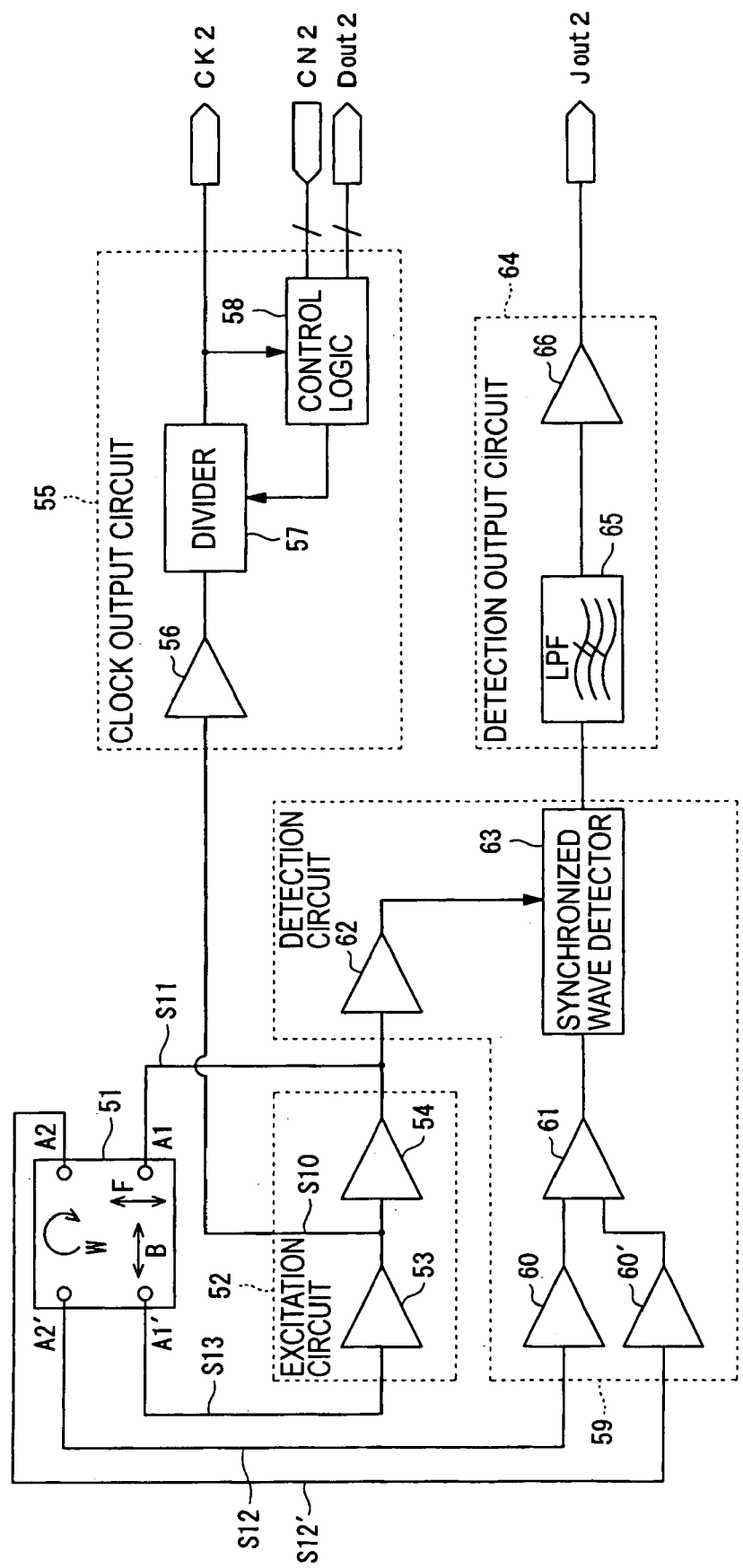
FIG. 6 is a block diagram showing a configuration of a vibration type gyro sensor according to a fifth embodiment of the present invention.

FIG. 6 is a block diagram showing a configuration of a vibration type gyro sensor according to a fifth embodiment of the present invention.

Referring to FIG. 6, the vibration type gyro sensor comprises an electrostatic vibrator 51, an excitation circuit 52 for exciting the electrostatic vibrator 51, a detection circuit 59 for detecting a coriolis force F which acts on the vibration B when the electrostatic vibrator 51 rotates at an angular velocity ω, a detection output circuit 64 for generating an angular velocity signal Jout2 based on an output from the detection circuit 59, and a clock output circuit 55 for generating a timer clock signal based on the excitation signal S10 which excites the electrostatic vibrator 51.

Figure 7:
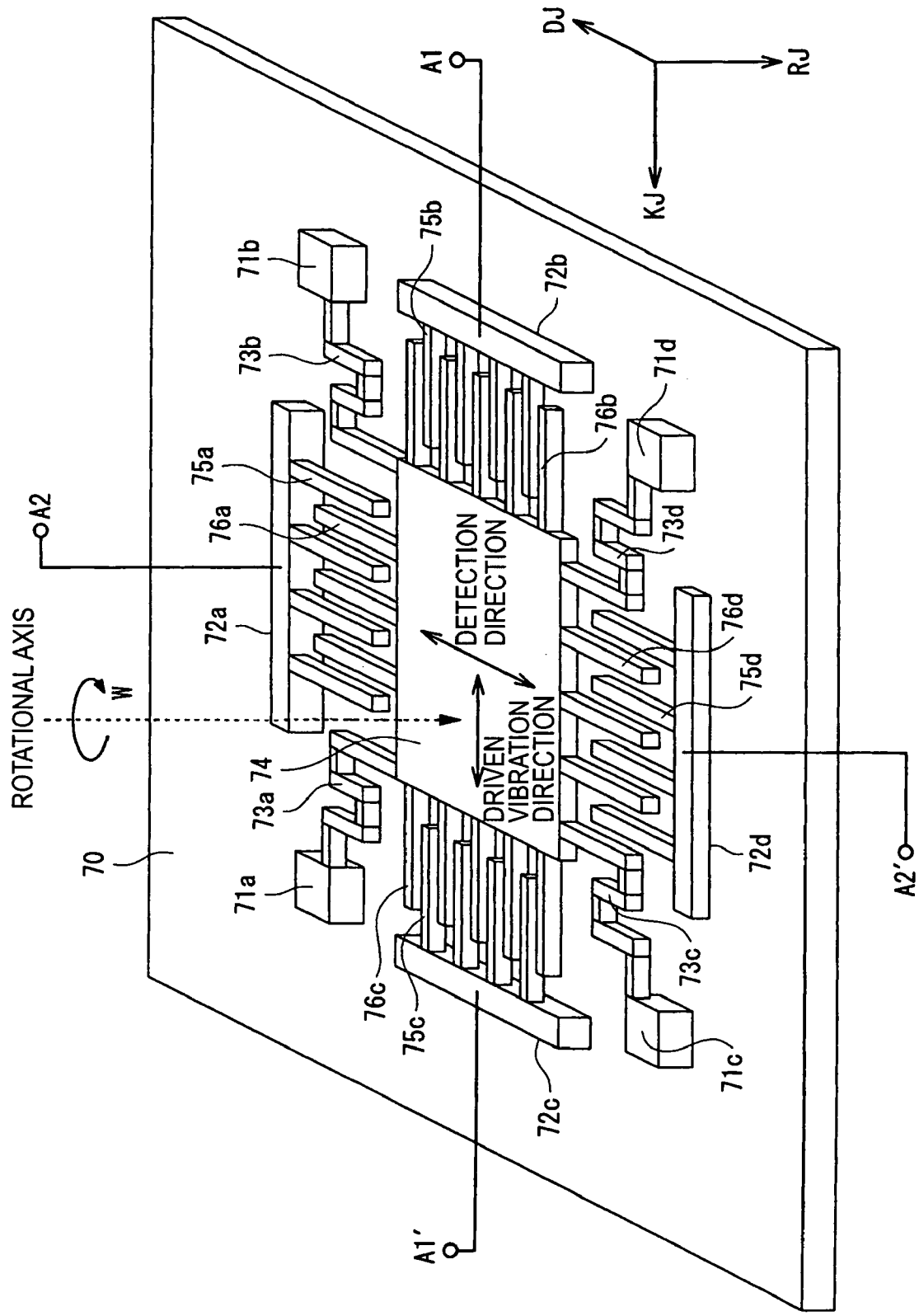
FIG. 7 is a perspective view showing a configuration of an electrostatic vibrator shown in FIG. 6.

FIG. 7 is a perspective view showing a configuration of the electrostatic vibrator 51 shown in FIG. 6. Moreover, FIG. 7 shows a case in which a surface micromachining vibrator is used as the electrostatic vibrator 51.

Referring to FIG. 7, the electrostatic vibrator 51 is provided with a body 74 serving as a mass and a substrate 70 supporting the body 74. In this case, support anchors 71a to 71d are formed on the substrate 70 and deflection portions 73a to 73d are formed at four corners of the body 74 respectively. The body 74 is connected to the support anchors 71a to 71d through the deflection portions 73a to 73d and is suspended on the substrate 70 so as to shake (vibrate) in a direction horizontal to the substrate 70. In this case, movable fingers 76b and 76c are connected to a pair of sides of the body 74 to project in a vibration direction of the body 74, respectively, and movable fingers 76a and 76d are connected to the other pair of sides of the body 74 to project in a detection direction of the coriolis force F.

In addition, support members 72a to 72d disposed to face the respective sides of the body 74 are formed around the body 74 on the substrate 70. To the support members 72a to 72d, fixed fingers 75a to 75d to be engaged with the movable fingers 76a to 76d are respectively connected. A driving terminal A1 to which a driving signal S11 for driving the body 74 is input is provided in the support member 72b, and a feedback terminal A1' from which a feedback signal S13 for monitoring detection signals S12 and S12' is output is provided in the support member 72c. Further, detection terminals A2 and A2' from which the detection signals S12 and S12' indicating a differential capacitance generated by acting the coriolis force F on the vibration B are output are provided in the support members 72a and 72d. Moreover, the resonance frequency of the electrostatic vibrator 51 is preferably set to 32.768'N kHz (where N is a positive integer).

Then, if an alternating current (AC) voltage is applied to the driving terminal Al of the electrostatic vibrator 51, the body 74 shakes along a driving axis KJ. In the state in which the body 74 shakes along the driving axis KJ, if the electrostatic vibrator 51 rotates around a rotational axis RJ at an angular velocity ω, the coriolis force F acts in a direction of a detection axis DJ, such that the body 74 shakes along the detection axis DJ. For this reason, the capacitance between the fixed finger 75a and the movable finger 76a and the capacitance between the fixed finger 75d and the movable finger 76d change, such that the detection signals S12 and S12' corresponding to the coriolis force F are generated by the detection terminals A2 and A2'. In this case, since the coriolis force F is proportional to the angular velocity ω, the angular velocity ω can be obtained by deriving the detection signals S12 and S12' generated by the detection terminals A2 and A2'.

That is, referring to FIG. 6, the gain of the excitation signal S10 generated by the oscillation circuit 53 is adjusted by the automatic gain adjusting circuit 54, and the driving signal S11 for driving the electrostatic vibrator 51 is output. Then, the driving signal S11 output from the automatic gain adjusting circuit 54 is input to the driving terminal A1, such that the body 74 of the electrostatic vibrator 51 shakes along the driving axis KJ. In this situation, a mechanical vibration is converted to an electrical signal and the electrical signal is derived from the feedback terminal A1', such that the feedback signal S13 is fed back to the oscillation circuit 53. Accordingly, an oscillation loop can be configured with the oscillation circuit 53, and thus the electrostatic vibrator 51 can be oscillated with the natural frequency of the body 74. Further, by controlling the amplitude of the driving signal S11 by the automatic gain adjusting circuit 54, the natural vibration amplitude of the body 74 can be always maintained at a constant value, such that the sensitivity can be stabilized.

Meanwhile, the detection signals S12 and S12' generated by the detection terminals A2 and A2' of the electrostatic vibrator 51 are converted from a current to a voltage by IV conversion amplifier 60 and 60', respectively. The converted detection signals are differentially amplified by a differential amplifier 61 and are input to a synchronized wave detector 63. In addition, the synchronized wave detector 63 is provided with the driving signal S11 through the right angle phase shifter 62, and the signal amplified by the differential amplifier 61 is wave-detected in synchronization with a reference phase of the oscillation circuit 53. That is, the detection signal S12 is equivalent to a signal which is amplitude-modulated at the angular velocity ω with the frequency of the driving signal S11 as a carrier. Thus, by wave-detecting the driving signal S11 as the reference signal in a synchronization manner, the angular velocity ω can be derived.

Then, the wave detection signal output from the synchronized wave detector 63 passes through a low pass filter 65, such that an overlapped high frequency component is removed from the wave detection signal. Then, the wave detection signal with the high frequency component removed is output through an output amplifier 66, such that the angular velocity signal Jout2 can be obtained.

Further, the excitation signal S10 generated by the oscillation circuit 53 is input to a divider 57 through a buffer 56. Here, a counter is provided in the divider 57 such that the excitation signal S10 can be divided in the divider 57 and then a timer clock signal CK2 can be generated. For example, if the resonance frequency of the electrostatic vibrator is set to 32.768×N kHz, by arranging fifteen counters parallel to each other, a signal of 1 Hz as the clock signal CK2 can be generated, such that a count operation can be performed for every second.

Further, a control logic 58 is supplied with the clock output CK2 and a control signal CN2 such that a RTC having the time and calendar function can be configured based on the clock signal CK2. Then, the time and date information generated by the control logic 58 can be output as a data signal Dout2.

Here, by generating the timer clock signal CK2 based on the excitation signal S10 for exciting the vibration type gyro sensor, the electrostatic vibrator 51 of the vibration type gyro sensor can be used in order to generate the timer clock signal CK2. For this reason, there is no need for mounting a RTC module separately from the vibration type gyro sensor in order to generate the time and date information. Thus, while suppressing the device from being large and the manufacturing cost from increasing, both the time and calendar function and the angular velocity detection function can be realized.

Further, a surface micromachining vibrator may be employed as the electrostatic vibrator 51. Thus, the vibration type gyro sensor can be configured with a micromachining technology, such that the vibration type gyro sensor can be small.

What is claimed is:

1. A clock generating device comprising:
   a unit for generating a timer clock signal based on an excitation signal which excites a vibration type gyro sensor at a resonance frequency of 32.768×N kHz, wherein N is a positive integer and the unit includes:
   a time information output unit for outputting time information; and
   a date information output unit for outputting date information.
   wherein the time and date information are based on the resonance frequency.

2. A vibration type gyro sensor comprising:
   an exciting unit for exciting a vibrator;
   a detecting unit for detecting a Coriolis force which acts in a direction orthogonal to an excitation direction of the vibrator; and
   a clock generating unit for generating a timer clock signal based on an excitation signal which excites the vibrator at a resonance frequency of 32.768×N kHz, wherein N is a positive integer and the unit includes:
   a time information output unit for outputting time information; and a date information output unit for outputting date information,
  wherein the time and date information are based on the resonance frequency.

3. The vibration type gyro sensor according to claim 2, wherein the vibrator comprises one of a piezoelectric vibrator and an electrostatic vibrator.

4. The vibration type gyro sensor according to claim 3, wherein the piezoelectric vibrator comprises a quartz vibrator.

5. The vibration type gyro sensor according to claim 3, wherein the electrostatic vibrator comprises a surface micromachined vibrator.

6. The vibration type gyro sensor according to claim 5, wherein the surface micromachined vibrator comprises:
  a body which is suspended on a substrate to shake in a direction horizontal to the substrate;
  a first movable finger which is provided in the body to project in a first direction horizontal to the substrate;
  a second movable finger which is provided in the body to project in a direction orthogonal to the first direction;
  a first fixed finger which is fixed to the substrate to be engaged with the first movable finger; and
  a second fixed finger which is fixed to the substrate to be engaged with the second movable finger.

7. The vibration type gyro sensor according to claim 2, further comprising:
  a stopping unit for causing the detecting unit to stop operations.

* * * * *